June 28, 1932.     J. W. HORTON     1,864,543
FREQUENCY MEASURING CIRCUITS
Filed March 2, 1927
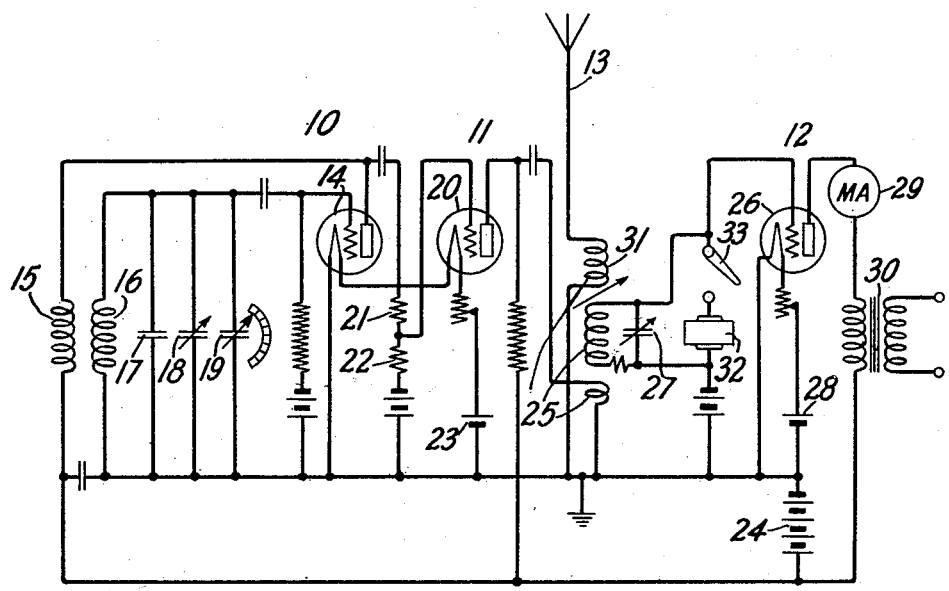
INVENTOR:
JOSEPH W. HORTON
BY
ATTORNEY Patented June 28, 1932

1,864,543

UNITED STATES PATENT OFFICE

JOSEPH W. HORTON, OF MILLBURN, NEW JERSEY, ASSIGNOR TO WESTERN ELECTRIC COMPANY, INCORPORATED, OF NEW YORK, N. Y., A CORPORATION OF NEW YORK

FREQUENCY MEASURING CIRCUITS

Application filed March 2, 1927. Serial No. 172,147.

This invention relates to frequency measuring circuits and has for an object to increase the stability and accuracy of such circuits.

In measuring circuits in which the frequency of a wave is determined by comparison with a calibrated standard frequency circuit, such as an oscillator, it is difficult if not impossible to economically construct circuit elements having sufficient stability to insure high accuracy of calibration over more than a very short period of time.

One such arrangement to which the present invention is particularly applicable is a portable frequency meter comprising a calibrated oscillator, a detector and an indicating instrument and means to enable current from a source of unknown frequency to be impressed simultaneously with waves from the calibrated oscillator upon the detector, the measurement being made by varying the calibrated oscillator until the beat frequency indicated by the indicating instrument becomes zero or other desired known value. In accordance with the preferred embodiment of this invention such a portable meter is provided with a mechanically vibratable frequency standard, the frequency of which is more stable than that of the calibrated oscillator and which is employed therewith to readjust or recalibrate the oscillator before readings are taken or whenever necessary. This vibratable standard preferably is of piezoelectric character such as a quartz crystal. It is of such material and size that its natural frequency lies well within the range of frequencies which the calibrated oscillator can produce. The correcting of the calibrated oscillator is preferably accomplished by setting its indicator to the frequency at which the mechanical standard is resonant and then adjusting a separate tuning element of the oscillator without changing its indicator, until a characteristic indication in the indicating device is obtained showing that the natural frequency of the mechanical standard is now being generated by the oscillator. When the oscillator is thus adjusted for a representative frequency the calibration is likely to be quite accurate for all frequencies which may be generated.

When the mechanical standard is of a material having the characteristics of a quartz crystal an indication as to when it is resonating may be had by making use of the property that when the material is placed in an electric circuit between the plates of a condenser and current is impressed upon the circuit varying in frequency over the range within which the natural frequency of the mechanical element lies, when that frequency is reached a large amount of electrostatic energy is transformed into mechanical energy so that the condenser is in effect shunted by a low resistance and the current rises to a well defined maximum value.

The properties of many piezo-electric substances particularly quartz are such that their critical frequencies change very little with external conditions such as temperature, atmospheric pressure and humidity.

This invention is illustrated in the accompanying drawing which shows one embodiment thereof.

Referring to the drawing, there is shown an oscillator 10 of the tuned grid circuit type, the output of which is connected through an amplifier 11 to a detector-modulator 12 on which are simultaneously impressed waves of unknown frequency from an antenna 13.

The oscillator 10 comprises a vacuum tube 14, the plate of which is connected to the tuned grid circuit through a feed back coil 15. The grid circuit is tuned by means of the inductance 16 and parallel condensers 17, 18 and 19. The output of the oscillator is impressed on the input electrodes of the vacuum tube amplifier 20 through resistances 21 and 22. Batteries 23 and 24 are arranged to supply cathode heating current and space current, respectively, to the tubes 14 and 20. The output of the amplifier tube 20 is transmitted through the transformer 25 to the detector-modulator 12 which comprises a three-electrode vacuum tube 26 having its input electrodes connected to the secondary winding of the transformer 25. A condenser 27 is connected in shunt to this winding to tune the input circuit of the detector-modulator. Cathode heating current is supplied to the detector tube from the battery 28 and space current is supplied from the common battery 24. An indicating meter 29 is connected in the output circuit of the tube 26 in series with the primary of a transformer 30. This transformer is provided for connecting a telephone receiver or another indicating instrument to the detector tube either directly or through an amplifier, as may be desired. Waves to be measured, for example, from antenna 13 are impressed upon the input of the detector-modulator through a primary winding 31 of the transformer 25. A quartz crystal 32 is connected in series with a key 33 in shunt to the condenser 27 and the secondary winding of the transformer 25 for standardizing the oscillator, as hereinafter described.

Condenser 19 is provided with a graduated scale having a zero point at its center. This condenser may be calibrated by impressing waves from a standard frequency source upon the primary winding 31 simultaneously with waves from the oscillator 10. The tuned input circuit of the detector is designed to resonate at approximately the frequency generated by the oscillator when the condenser 19 is set at its zero point and should have sufficient damping to be responsive to frequencies varying considerably from this value, for example, ±10 kilocycles. With the condenser 19 set at its zero point and a standard frequency source arranged to impress a wave of the frequency assigned to the oscillator on the primary winding 31, the standardizing condenser 18 is adjusted to give a zero beat in the detector-modulator 12. This may be indicated either by the meter 29 or by means of a telephone receiver connected to the secondary winding of the transformer 30. Holding the standard frequency source constant, condenser 19 is set at various scale positions and the frequency difference between the waves generated by the oscillator 10 and those from the standard source is determined by comparing the beat note in the output of the detector 12 with a calibrated low frequency oscillator. With equipment now available, the frequency generated by the oscillator 10 for any scale reading can be determined with an absolute accuracy of one part in 100,000.

At present it is economically impossible to build elements having sufficient stability to insure the accuracy of this calibration over more than a very short period of time. To overcome this difficulty a very small condenser 32 having a quartz plate cut from a crystal mounted between its plates is connected in shunt to the tuned input circuit of the detector-modulator. The mechanical dimensions of this quartz plate are such that it is resonant at some frequency included in the range of the calibrated condenser 19. This crystal, at its resonant frequency, is capable of transforming a large amount of electrostatic energy into mechanical energy, thereby effectively shunting the condenser of the tuned circuit by a small resistance, the impedance reaching a well defined minimum value. With such a device it is found that the deflection of the meter in the output of the detector falls almost to zero as the frequency of the oscillator 10 is varied through the resonant frequency of the crystal. Due to the extremely low damping of the crystal at the resonant frequency, the effect in the indicator is so well defined that it is entirely possible to set a given frequency to a precision of one part in 50,000. It is important that this effect depend almost entirely upon the characteristics of the crystal and to a negligible extent only upon the properties of the circuit, such as the frequency of the electrical resonance system.

The properties of quartz are such that its resonant frequency varies little with external conditions, such as temperature, atmospheric pressure, humidity and the like. Such a crystal therefore serves to fix a point on the frequency scale with great accuracy and consistency.

With the condenser 19 set at the scale reading corresponding to the critical frequency of the crystal and the crystal condenser 32 connected in circuit by means of the key 33, the oscillator may be standardized by adjusting the condenser 18 to give the minimum deflection in the meter 29 corresponding to the resonant frequency of the crystal. After this standardization adjustment is made, the calibration curve of the meter is correct to limits fixed entirely by the precision with which the scale may be read and the circuit is ready for use.

The key 33 is now opened and the unknown wave to be measured is impressed upon the detector-modulator 12 through the primary winding 31. In case the circuit is being used in close proximity to a radio transmitting station for measuring the frequency of the carrier wave, the coupling between the primary winding 31 and the secondary winding of the transformer 25 should be made very loose. In case the meter is to be used at a considerable distance from the radio transmitter, it may be necessary to amplify the carrier wave picked up by the antenna before impressing it upon the detector-modulator 12, in which case an ordinary radio frequency amplifier may be connected between the antenna 13 and the primary winding 31. With the wave properly impressed upon the tuned input circuit of the detector-modulator 12, the condenser 19 is adjusted to give a zero beat note which may be indicated audibly by head phones or a loud speaker connected to the secondary winding of the transformer 30 or, if the frequencies are sufficiently stable, by observing the beats in the meter 29. Having adjusted the condenser 19 for a zero beat, the frequency of the unknown wave is given by the known calibration of the condenser scale.

In the form described, the meter is of course limited to observation of frequencies lying within a fairly restricted range. It is entirely practicable, however, to provide a number of fixed capacity values for the condenser 17 and to determine the calibration of the condenser for each of these values. It will then be necessary to use a separate crystal for accurately adjusting each of the capacities to bring the calibration of the instrument to its original position. Using crystals varying between the practical limits of 6 c. m. and 0. 3 c. m. in length, it would be possible, with this addition, to build a meter covering any frequency range between 50,000 and 1,000,000 cycles with an absolute accuracy of better than 50 cycles over the entire range. This range may be considerably extended without decreasing the length of the crystal by adjusting the latter so that one of its harmonics lies within the range to be covered.

What is claimed is:

1. A frequency meter comprising a source of current of variable frequency, means upon which current from said source may be impressed with current from an unknown source to set up oscillations of beat frequency, a mechanically vibratable element, the fundamental natural frequency of which is stable and well within the range of frequency which may be generated by said source, means for associating said element with said means, and an indicator for determining when said source is adjusted to generate the frequency of said element.

2. In a frequency meter, a variable frequency source, calibrated means for controlling the frequency of said source, a body of piezo-electric character, standardizing means for adjusting the frequency of said source to the critical frequency of said piezo-electric body, when said calibrated means is set by a definite point, and indicating means including said body of piezo-electric character.

3. A combination according to the preceding claim in which the piezo-electric body is a quartz crystal.

4. A frequency meter comprising an oscillator, a detector having a tuned input circuit, calibrated means for controlling the frequency of said oscillator, a body of piezo-electric character associated with said detector, and standardizing means for adjusting the frequency of said oscillator to give an indication in said detector when said calibrated means is set at a definite position.

5. A frequency meter comprising a variable frequency source, calibrated means for controlling the frequency of said source, a detecting circuit including a body of piezo-electric character, standardizing means to adjust the frequency of said source to the critical frequency of said piezo-electric body when said calibrated means is set at a known point, and means for simultaneously impressing waves from said source and waves to be tested upon said detecting circuit to obtain a zero beat, whereby the departure of the frequency of the waves to be tested from the critical frequency of said piezo-electric body is indicated by the calibrated means.

6. A frequency meter comprising an electric discharge oscillator, means for controlling the frequency of waves generated thereby, an electric discharge detector, a tuned input circuit therefor, means for impressing waves from said oscillator upon said detector, a body of piezo-electric character associated with said detector, standardizing means for adjusting the frequency of said oscillator to the critical frequency of said piezo-electric body, and means for impressing waves to be tested upon said detector, simultaneously with waves from said oscillator, to give a zero beat whereby the departure of the frequency of the waves to be tested from the critical frequency of said body is indicated by the calibrated means.

7. A frequency meter according to the preceding claim in which the piezo-electric body is a quartz crystal.

In witness whereof, I hereunto subscribe my name this 26th day of February A. D., 1927.

JOSEPH W. HORTON.